United States Patent [19]
Hayashi et al.

[11] Patent Number: 6,030,535
[45] Date of Patent: Feb. 29, 2000

[54] METHOD OF AND APPARATUS FOR PRODUCING POTABLE WATER AND SALT

[75] Inventors: Yukiko Hayashi, Sakai; Shiro Fukui, Chiba; Yutaka Nakamura, Narashino, all of Japan

[73] Assignee: Yukiko Hayashi, Sakai, Japan

[21] Appl. No.: 08/844,922

[22] Filed: Apr. 22, 1997

[30] Foreign Application Priority Data

Apr. 24, 1996 [JP] Japan ..................................... 8-102971

[51] Int. Cl.[7] .................................................... B01D 61/00
[52] U.S. Cl. .......................... 210/652; 210/638; 210/760; 210/175; 210/663; 210/257.2; 204/182.5; 204/296
[58] Field of Search ................................. 210/652, 195.2, 210/638, 175, 663, 760, 257.2; 204/182.5, 296

[56] References Cited

U.S. PATENT DOCUMENTS

| | | |
|---|---|---|
| 4,083,781 | 4/1978 | Conger . |
| 4,217,200 | 8/1980 | Kedem et al. ............................ 204/296 |
| 4,808,287 | 2/1989 | Hack ......................................... 210/652 |
| 5,238,574 | 8/1993 | Kawashima et al. .................... 210/652 |

FOREIGN PATENT DOCUMENTS

| | | |
|---|---|---|
| 52-50557 | 5/1977 | Japan . |
| 53-9278 | 1/1978 | Japan . |
| 0035989 | 2/1982 | Japan . |
| 3044989 | 2/1988 | Japan ..................................... 210/652 |
| 1-139893 | 9/1989 | Japan . |
| 7-185573 | 7/1995 | Japan . |
| 8-71556 | 3/1996 | Japan . |
| 9-117783 | 5/1997 | Japan . |
| 9-276864 | 10/1997 | Japan . |

*Primary Examiner*—Ana Fortuna
*Attorney, Agent, or Firm*—Armstrong, Westerman, Hattori, McLeland and Naughton

[57] ABSTRACT

Original seawater is supplied to a pre-treatment equipment, and a flocculated material produced by exerting a magnetic force and injecting ozone is removed by filtration. The seawater pretreated by the pre-treatment equipment is supplied to a reverse osmosis membrane module. Concentrated salt water discharged from the reverse osmosis membrane module is supplied to an electrodialyser unit. The concentrated salt water discharged from the electrodialyser unit is supplied to an evaporator. In the evaporator, the concentrated salt water is evaporated to dry solid salt. A part or all of desalted water discharged from the electrodialyser unit is returned to the reverse osmosis membrane module. Permeated water discharged from the reverse osmosis membrane module and evaporated water obtained by the evaporator are supplied as potable water.

8 Claims, 13 Drawing Sheets

F I G. 9
(COMPARATIVE EXAMPLE 1)
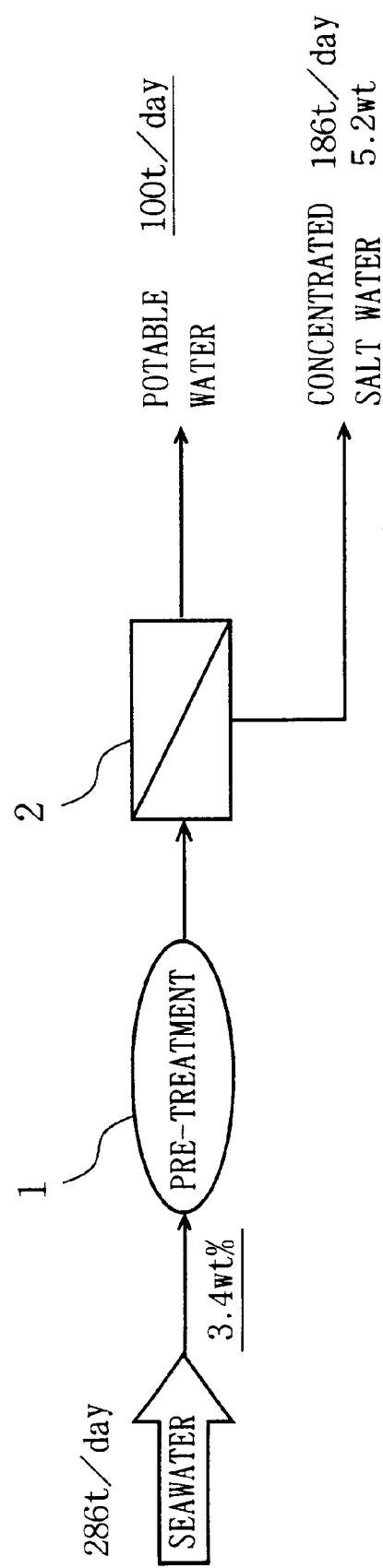

(COMPARATIVE EXAMPLE 2)

(COMPARATIVE EXAMPLE 3)

(COMPARATIVE EXAMPLE 4)

(EMBODIMENT 1)

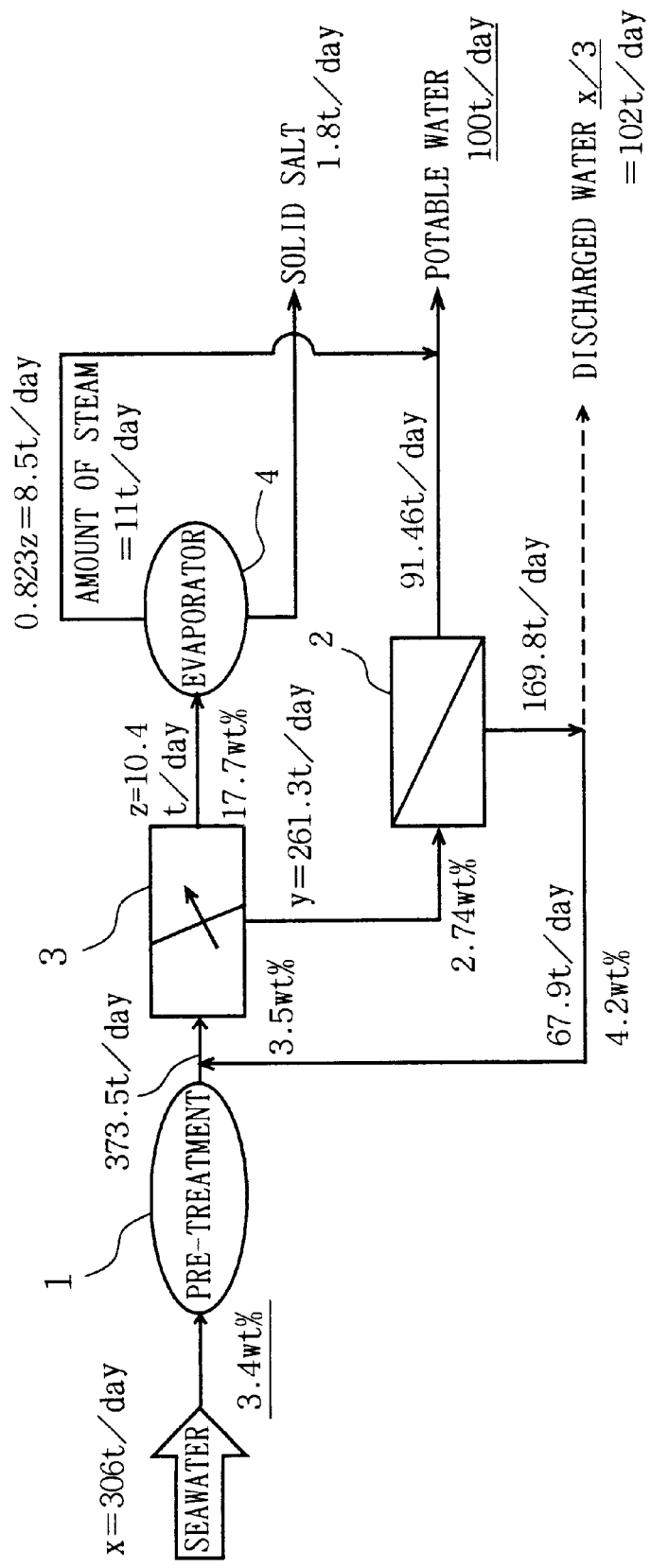
FIG. 14 (EMBODIMENT 2)

METHOD OF AND APPARATUS FOR PRODUCING POTABLE WATER AND SALT

BACKGROUND OF THE INVENTION

1. Field of the Invention

The present invention relates to a method of and an apparatus for producing potable water and special salt from salt water (seawater or brackish water). The special salt means salt containing salts in the salt water.

2. Description of the Prior Art

In order to solve chronic shortage of water in isolated islands, a seawater desalting method using a reverse osmosis (RO) membrane has been embodied in recent years. In the seawater desalting method, permeated water obtained by the reverse osmosis membrane is utilized as potable water, and concentrated salt water is discharged into a sea area.

On the other hand, electrodialysis (ED) has been used in order to produce common salt. In the electrodialysis, seawater is concentrated using an ion exchange membrane, and moisture of concentrated salt water obtained is evaporated, to deposit sodium chloride (NaCl).

According to the above-mentioned seawater desalting method using the reverse osmosis membrane, the concentrated salt water having a higher salt concentration than that of the seawater is discharged into the sea area, whereby it is feared that weeds and fishes such as the young of fishes and shellfishes are adversely affected. The seawater is sterilized using chlorine in pretreatment using the reverse osmosis membrane, whereby there is also a possibility of phytotoxicity. Further, the recovery of the reverse osmosis membrane is approximately 30 to 40%. Therefore, 60 to 70% of the seawater pretreated at high cost is discharged as it is into the sea area, whereby the utilization factor of the seawater is low, and the cost of equipment and the operating cost are increased.

On the other hand, salt produced by the electrodialysis is composed of only NaCl, whereby it cannot be said that it tastes good. Therefore, salt obtained by mixing an additive such as bittern with common salt is preferable.

SUMMARY OF THE INVENTION

An object of the present invention is to provide a method of and an apparatus for producing potable water while producing salt containing mineral from salt water (seawater or brackish water), in which the utilization factor of the salt water is high, the amount of discharged water is small, the salt concentration of the discharged water is low, and there is no possibility of phytotoxicity.

A method of producing potable water and salt according to the present invention comprises the step of treating salt water using a reverse osmosis membrane and electrodialysis, to concurrently produce potable water and salt.

When the salt water is treated using the reverse osmosis membrane in the preceding stage, and is treated using the electrodialysis in the succeeding stage, permeated water obtained by the reverse osmosis membrane is used as potable water, concentrated salt water obtained by the reverse osmosis membrane is treated by the electrodialysis, and salt is evaporated and dried from the concentrated salt water obtained by the electrodialysis. At this time, evaporated water of the concentrated salt water can be also used as potable water. Further, a part or all of desalted water obtained by the electrodialysis is returned to the reverse osmosis membrane, so that the amount of discharged water can be decreased, and the utilization factor of the salt water can be increased.

Since the salt concentration of the desalted water obtained by the electrodialysis is lower than the salt concentration of the salt water, there is no possibility that weeds and fishes such as the young of fishes and shellfishes are adversely affected.

When the salt water is treated using the electrodialysis in the preceding stage, and is treated using the reverse osmosis membrane in the succeeding stage, desalted water obtained by the electrodialysis is treated by the reverse osmosis membrane, permeated water obtained by the reverse osmosis membrane is used as potable water, and salt is evaporated and dried from concentrated salt water obtained by the electrodialysis. At this time, evaporated water of the concentrated salt water can be also used as potable water. Further, a part or all of the concentrated salt water obtained by the reverse osmosis membrane is returned to treatment using the electrodialysis, so that the amount of discharged water can be decreased, and the utilization factor of the salt water can be increased.

Since the desalted water obtained by the electrodialysis is supplied to the reverse osmosis membrane, the salt concentration of the concentrated salt water obtained by the reverse osmosis membrane is not made so higher than the salt concentration of the salt water. Consequently, the possibility that weeds and fishes such as the young of fishes and shellfishes are adversely affected is small.

Particularly, it is preferable that the method of producing potable water and salt further comprises the step of pretreating the salt water using ozone. Consequently, inorganic materials (inorganic matter) and organic materials (organic matter) in the salt water can be removed without injecting medicines. Consequently, salt containing mineral in the salt water, for example bittern, is obtained.

It is preferable that the pretreatment comprises exerting a magnetic force on the salt water and injecting the ozone. In this case, the inorganic materials and the organic materials are oxidized by the ozone, and colloidal materials produced by the oxidation of the inorganic materials and suspended materials produced by the oxidation of the organic materials are flocculated without using chemicals such as a flocculant.

Furthermore, it is preferable that the pretreatment further comprises removing a flocculated material (an aggregate) obtained by the exertion of the magnetic force and the injection of the ozone by filtration. Consequently, the flocculated material can be easily removed.

It is preferable that the step of concurrently producing potable water and salt uses an ion exchange membrane having selective permeability for preventing the permeation of predetermined divalent anion (bivalent anion) in the electrodialysis. Consequently, a scale is prevented from being produced on the side of the concentrated salt water obtained by the electrodialysis. It is preferable that salt obtained by the evaporation of the concentrated salt water contains mineral in the salt water.

A method of producing potable water and salt according to another aspect of the present invention comprises the steps of separating salt water into permeated water and concentrated salt water by a reverse osmosis membrane, separating the concentrated salt water into concentrated salt water and desalted water by electrodialysis, evaporating moisture of the concentrated salt water obtained by the electrodialysis to dry salt, and supplying the permeated water and evaporated water as potable water.

In this case, the salt concentration of the desalted water obtained by the electrodialysis is lower than the salt concentration of the salt water, whereby there is no possibility that weeds and fishes such as the young of fishes and shellfishes are adversely affected. Further, the evaporated water of the concentrated salt water can be used as potable water, whereby the utilization factor of the salt water is increased, and the amount of discharged water can be decreased.

It is preferable that the method of producing potable water and salt further comprises the step of returning a part or all of the desalted water obtained by the electrodialysis to the reverse osmosis membrane. Consequently, the amount of discharged water is further decreased, and the utilization factor of the salt water can be further increased.

Particularly, it is preferable that the method of producing potable water and salt further comprises the step of pretreating the salt water using ozone, and then supplying the pretreated salt water to the reverse osmosis membrane. Therefore, inorganic materials and organic materials can be removed without injecting chemicals. Consequently, salt containing mineral in the salt water, for example bittern, is obtained.

It is preferable that the pretreatment comprises exerting a magnetic force on the salt water and injecting the ozone. In this case, the inorganic materials and the organic materials are oxidized by the ozone, and colloidal materials produced by the oxidation of the inorganic materials and suspended materials produced by the oxidation of the organic materials are flocculated without using chemicals such as a flocculant.

Furthermore, it is preferable that the pretreatment further comprises removing a flocculated material obtained by the exertion of the magnetic force and the injection of the ozone by filtration. Consequently, the flocculated material can be easily removed.

It is preferable that the step of separating the salt water uses an ion exchange membrane having selective permeability for preventing the permeation of predetermined divalent anion in the electrodialysis. Consequently, a scale is prevented from being produced on the side of the concentrated salt water obtained by the electrodialysis. It is preferable that salt obtained by evaporating the concentrated salt water contains mineral in the salt water.

An apparatus for producing potable water and salt according to still another aspect of the present invention comprises a reverse osmosis membrane module, and an electrodialyser unit (tank), salt water being treated by a combination of the reverse osmosis membrane module and the electrodialyser unit, to concurrently produce potable water and salt.

In this producing apparatus, permeated water obtained by the reverse osmosis membrane module is used as potable water, and salt is produced from concentrated salt water obtained by the electrodialyser unit. At this time, evaporated water of the concentrated salt water can be used as potable water. Further, a part or all of desalted water obtained by the electrodialyser unit is supplied to the reverse osmosis membrane module, whereby the amount of discharged water can be decreased, and the utilization factor of the salt water can be increased.

The salt concentration of the desalted water obtained by the electrodialyser unit is lower than the salt concentration of the salt water. If a part of the desalted water obtained by the electrodialyser unit or the concentrated salt water obtained by the reverse osmosis membrane module is discharged into a sea area, therefore, there is no possibility that weeds and fishes such as the young of fishes and shellfishes are adversely affected.

It is preferable that the apparatus for producing potable water and salt further comprises a pre-treatment equipment for pretreating the salt water using ozone. Therefore, inorganic materials and organic materials in the salt water can be removed without injecting chemicals. Consequently, salt containing mineral in the salt water, for example bittern, is obtained.

An apparatus for producing potable water and salt according to a further aspect of the present invention comprises a reverse osmosis membrane module for separating salt water into permeated water and concentrated salt water, an electrodialyser unit for separating the concentrated salt water obtained by the reverse osmosis membrane module into concentrated salt water and desalted water, and an evaporator for evaporating moisture of the concentrated salt water obtained by the electrodialyser unit to dry salt, the permeated water obtained by the reverse osmosis membrane module and evaporated water obtained by the evaporator being supplied as potable water.

In the producing apparatus, the salt water is separated into the permeated water and the concentrated salt water by the reverse osmosis membrane module, and the concentrated salt water is further separated into the concentrated salt water and the desalted water by the electrodialyser unit. Moisture of the concentrated salt water obtained by the electrodialyser unit is evaporated by the evaporator, so that salt is dried. The permeated water obtained by the reverse osmosis membrane module and the evaporated water obtained by the evaporator are supplied as potable water.

In this case, the salt concentration of desalted water obtained by the electrodialyser unit is lower than the salt concentration of the salt water, whereby there is no possibility that weeds and fishes such as the young of fishes and shellfishes are adversely affected. Further, the evaporated water of the concentrated salt water can be used as potable water, whereby the utilization factor of the salt water is increased, and the amount of discharged water can be decreased.

It is preferable that the apparatus for producing potable water and salt further comprises a path for returning a part or all of the desalted water obtained by the electrodialyser unit to the reverse osmosis membrane module. Consequently, the amount of discharged water is further decreased, and the utilization factor of the salt water is further increased.

Furthermore, it is preferable that the apparatus for producing potable water and salt further comprises a pretreatment equipment for pretreating the salt water using ozone, and supplying the pretreated salt water to the reverse osmosis membrane module. Consequently, it is possible to remove inorganic materials and organic materials in the salt water without injecting chemicals. Consequently, salt containing mineral in the salt water, for example bittern, is obtained.

The pre-treatment equipment may comprise an ozone generator, a magnetic treatment reactor comprising a magnetic treatment section, into which the salt water is introduced, for exerting a predetermined magnetic force on the salt water and an ozone injection and mixing section for injecting ozone generated by the ozone generator into the salt water from the magnetic treatment section, followed by mixing, and a filter for removing a flocculant in the salt water obtained by the magnetic treatment reactor.

In the pre-treatment equipment, the inorganic materials and the organic materials are oxidized by the ozone, colloidal materials produced by the oxidation of the inorganic materials and suspended materials produced by the oxidation of the organic materials are flocculated without using chemicals such as a flocculant, and a flocculated material obtained is removed by filtration. Consequently, salt containing mineral in the salt water, for example bittern, is easily obtained.

Furthermore, the pre-treatment equipment may comprise first and second ozone generators, a first magnetic treatment reactor comprising a magnetic treatment section, into which the salt water is introduced, for exerting a predetermined magnetic force on the salt water and an ozone injection and mixing section for injecting ozone generated by the first ozone generator into the salt water from the magnetic treatment section, followed by agitation, a first filter for removing a flocculated material in the salt water obtained by the first magnetic treatment reactor, a second magnetic treatment reactor comprising a magnetic treatment section, into which the salt water discharged from the first filter is introduced, for exerting a predetermined magnetic force on the salt water and an ozone injection and mixing section for injecting ozone generated by the second ozone generator into the salt water from the magnetic treatment section, followed by mixing, a reactor unit (tank), into which the salt water discharged from the second magnetic treatment reactor is introduced, for oxidizing and decomposing the salt water by a catalyst bed composed of active carbon, and a second filter for removing a flocculated material in the salt water obtained by the reactor unit.

Consequently, the salt water can be pretreated without adding chemicals such as a flocculant, and the utilization factor of the ozone is increased. Consequently, the cost of the pretreatment is reduced, so that salt containing mineral in the salt water is obtained at low cost.

It is preferable that the electrodialyser unit includes an ion exchange membrane having selective permeability for preventing the permeation of predetermined divalent anion. Consequently, a scale is prevented from being produced on the side of the concentrated salt water obtained by the electrodialyser unit, so that the life of the ion exchange film is increased. Further, it is preferable that salt obtained by the evaporator includes mineral in the salt water.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing a producing method and an example of calculation in a comparative example 1;

FIG. 14 is a diagram showing a producing method and an example of calculation in an embodiment 2.

DESCRIPTION OF THE PREFERRED EMBODIMENTS

Figure 1:
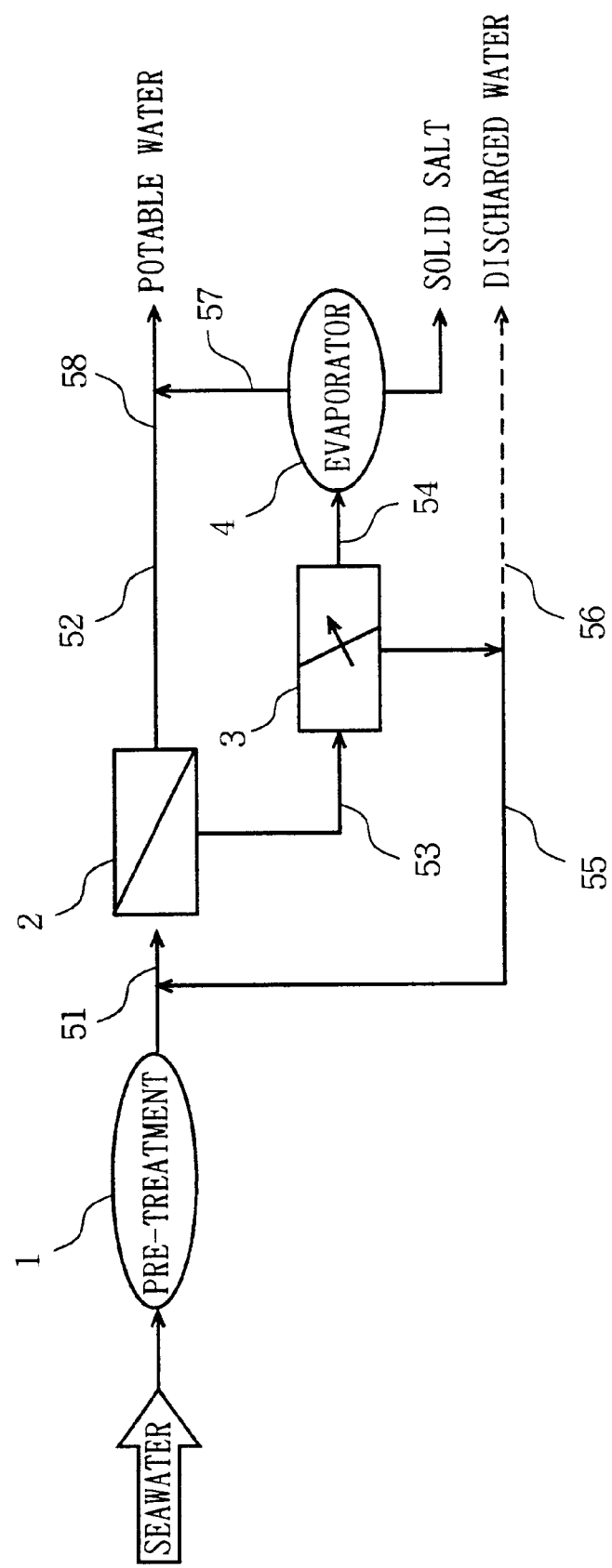
FIG. 1 is a diagram showing one example of an apparatus for producing potable water and salt according to the present invention.

FIG. 1 is a diagram showing one example of an apparatus for producing potable water and salt according to the present invention. The producing apparatus shown in FIG. 1 comprises a pre-treatment equipment (tank) 1, a reverse osmosis (RO) membrane module 2, an electrodialyser (ED) unit (tank) 3, and an evaporator 4.

Seawater (or brackish water having a high salt concentration) is supplied to the pre-treatment equipment 1. The detailed construction of the pre-treatment equipment 1 will be described later. The seawater pretreated by the pre-treatment equipment 1 is introduced into a feedwater inlet of the reverse osmosis membrane module 2 through feedwater piping 51. Permeated water discharged from a permeated water outlet of the reverse osmosis membrane module 2 is supplied to potable water piping 58 through permeated water piping 52.

Furthermore, concentrated salt water discharged from concentrated water outlet of the reverse osmosis membrane module 2 is introduced into a feedwater inlet of the electrodialyser unit 3 through concentrated water piping 53. The concentrated salt water discharged from a concentrated salt water outlet of the electrodialyser unit 3 is supplied to the evaporator 4 through concentrated water piping 54. Desalted water discharged from a desalted water outlet of the electrodialyser unit 3 is returned to the feedwater inlet of the reverse osmosis membrane module 2 through desalted water piping 55. A part of the desalted water discharged from the desalted water outlet of the electrodialyser unit 3 is discharged into a sea area through discharged water piping 56.

In the evaporator 4, moisture of the concentrated salt water is evaporated by a thin film evaporating and drying method or a drum drier, for example, so that solid salt is dried. Evaporated water obtained by the evaporator 4 is supplied to the potable water piping 58 through evaporated water piping 57. The permeated water obtained by the reverse osmosis membrane module 2 and the evaporated water obtained by the evaporator 4 are supplied as potable water by the potable water piping 58. The solid salt obtained by the evaporator 4 is special salt containing salts (mineral) in the seawater, for example bittern (magnesium, calcium, potassium, etc.), in addition to sodium chloride (NaCl).

The special salt is used for raw material salt for land farming, raw material salt of water in an aquarium, salt for pickles, and medical salt for treatment of dermatitis, atopy or the like, for example.

It is preferable that a special film through which only $SO_4^{2-}$ is not passed is used as an ion exchange membrane of the electrodialyser unit 3. Consequently, gypsum is not deposited on the side of the concentrated water obtained by the electrodialyser unit 3.

Figure 2:
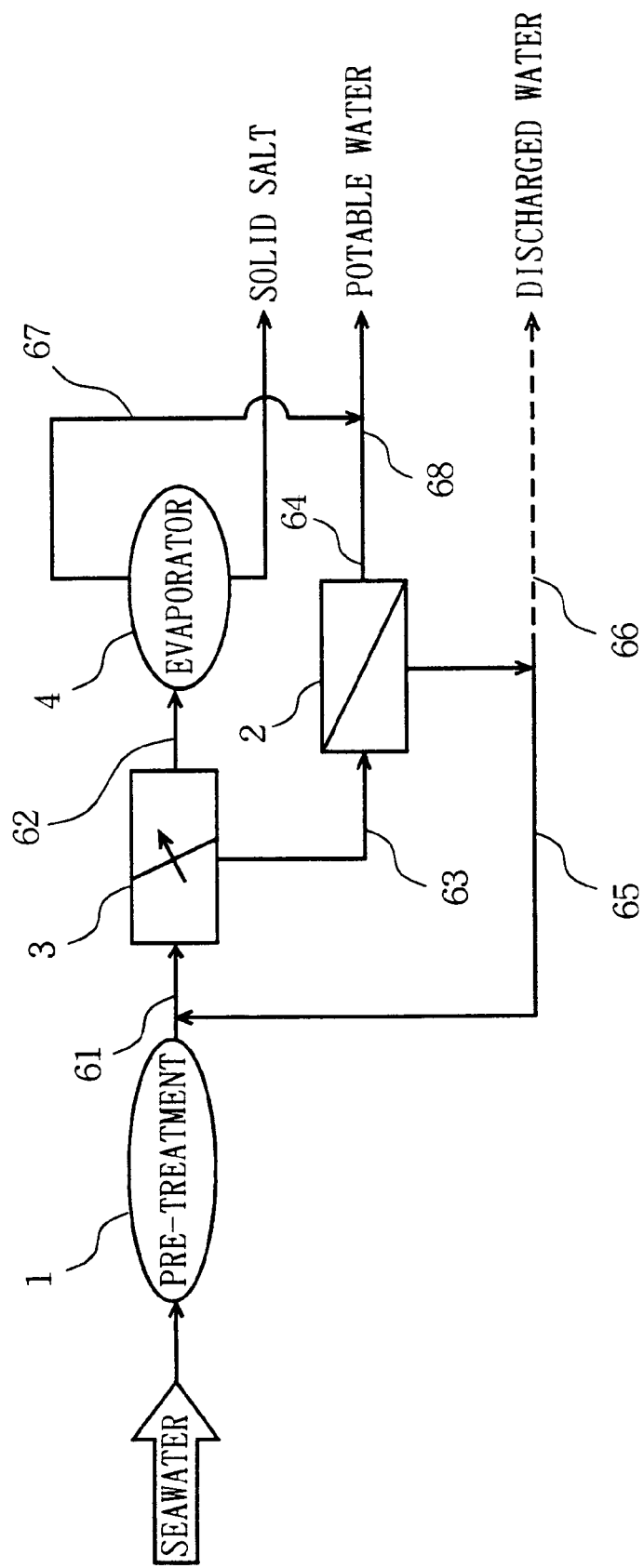
FIG. 2 is a diagram showing another example of an apparatus for producing potable water and salt according to the present invention.

FIG. 2 is a diagram showing another example of the apparatus for producing potable water and salt according to the present invention. The producing apparatus shown in FIG. 2 comprises a pre-treatment equipment 1, a reverse osmosis membrane module 2, an electrodialyser unit 3, and an evaporator 4.

Seawater is supplied to the pre-treatment equipment 1. The seawater pretreated by the pre-treatment equipment 1 is introduced into a feedwater inlet of the electrodialyser unit 3 through feedwater piping 61. Concentrated salt water discharged from a concentrated water outlet of the electrodialyser unit 3 is supplied to the evaporator 4 through concentrated water piping 62. Desalted water discharged from a desalted water outlet of the electrodialyser unit 3 is introduced into a feedwater inlet of the reverse osmosis membrane module 2 through desalted water piping 63.

Concentrated salt water discharged from a concentrated water outlet of the reverse osmosis membrane module 2 is returned to the feedwater inlet of the electrodialyser unit 3 through concentrated water piping 65. A part of the concentrated salt water discharged from the concentrated water outlet of the reverse osmosis membrane module 2 is discharged into a sea area through discharged water piping 66.

Permeated water discharged from a permeated water outlet of the reverse osmosis membrane module 2 is supplied to potable water piping 68 through permeated water piping 64. Evaporated water obtained by the evaporator 4 is supplied to the potable water piping 68 through evaporated water piping 67.

The permeated water obtained by the reverse osmosis membrane module 2 and the evaporated water obtained by the evaporator 4 are supplied as potable water by the potable water piping 68. Further, solid salt obtained by the evaporator 4 is used as special salt.

Figure 3:
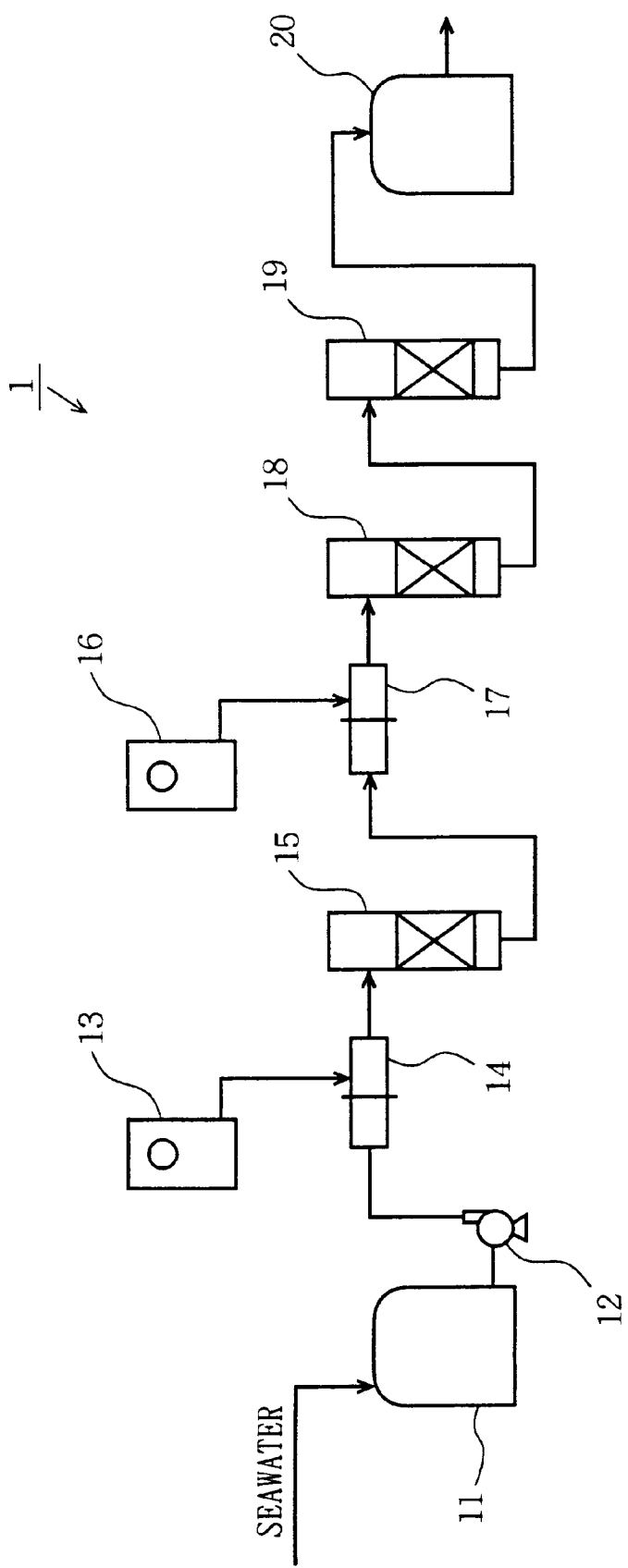
FIG. 3 is a diagram showing the construction of the whole of a pre-treatment equipment in FIGS. 1 and 2.

FIG. 3 is a diagram showing the construction of the pre-treatment equipment used in the producing apparatuses shown in FIGS. 1 and 2. The pre-treatment equipment 1 shown in FIG. 3 comprises a storage tank 11, a pump 12, a first ozone generator (ozonizer) 13, a first magnetic treatment reactor (ozone mixer) 14, a first filter 15, a second ozone generator (ozonizer) 16, a second magnetic treatment reactor 17, a reactor unit (tank) 18, a second filter 19, and a treated water unit (tank) 20.

Water to be treated (seawater) is stored in the storage tank 11. The pump 12 supplies the water to be treated in the storage tank 11 to the first magnetic treatment reactor 14 through a transfer pipe.

The first ozone generator 13 generates ozone (ozone gas). The first magnetic treatment reactor 14 exerts a predetermined magnetic force on the water to be treated, and injects (sucks) the ozone generated by the first ozone generator 13 into the water to be treated, followed by mixing and flocculation. The first filter 15 removes a reactant obtained by the flocculation in the first magnetic treatment reactor 14, i.e., a flocculated material.

The second ozone generator 16 generates ozone (ozone gas). The second magnetic treatment reactor 17 exerts a predetermined magnetic force on the water to be treated from which the flocculated material is removed by the first filter 15, and injects (sucks) the ozone generated by the second ozone generator 16 into the water to be treated, followed by mixing and flocculation. The reactor unit 18 brings granulated active carton (a catalyst bed) into contact with the water to be treated supplied from the second magnetic treatment reactor 17 as a catalyst and reacts the active carbon with the water to be treated. The second filter 19 removes a decomposed material (a reactant) obtained by oxidation and decomposition in the reactor unit 18. The treated water unit 20 stores the water to be treated from which the decomposed material is removed by the second filter 19, that is, treated water.

Figure 4:
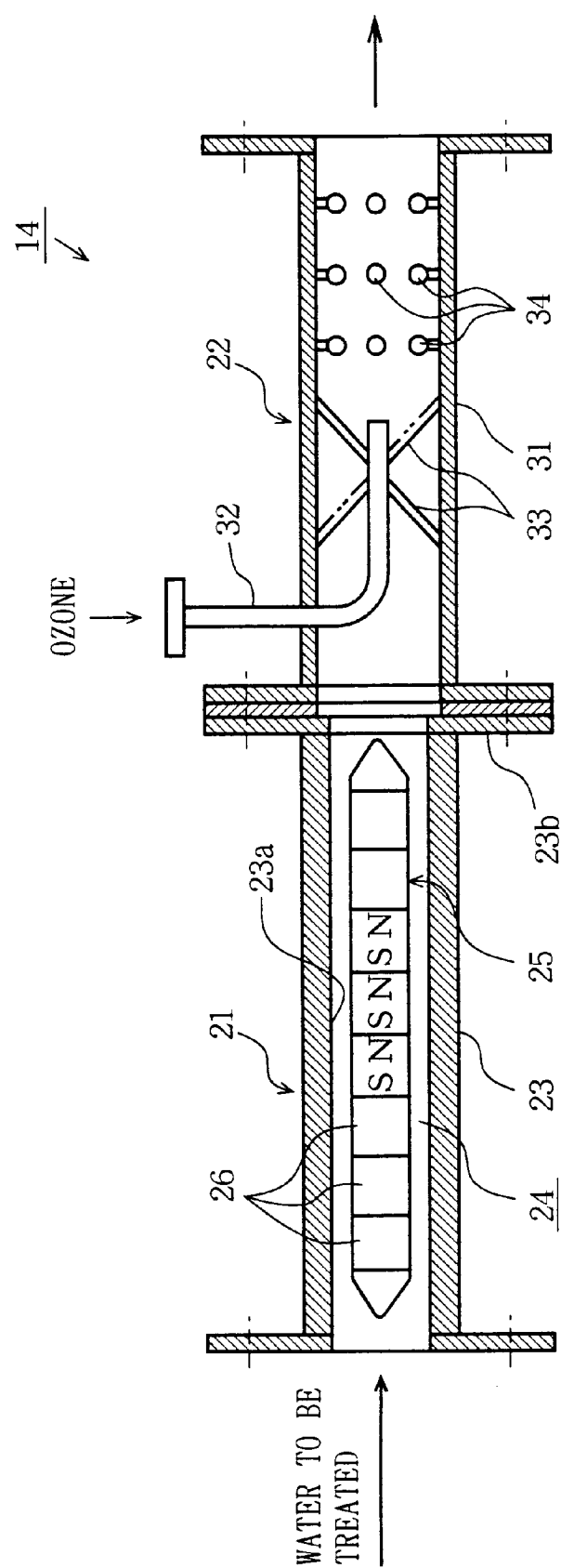
FIG. 4 is a cross-sectional view of a first magnetic treatment reactor in the pre-treatment equipment shown in FIG. 3.

FIG. 4 is a cross-sectional view showing the construction of the first magnetic treatment reactor 14 in the pre-treatment equipment 1. The construction of the second magnetic treatment reactor 17 is the same as the construction shown in FIG. 4.

As shown in FIG. 4, the first magnetic treatment reactor 14 comprises a magnetic treatment section 21 and an ozone injection and mixing section 22.

The magnetic treatment section 21 comprises a cylindrical member 23 and a stick-shaped magnet 25 each having a predetermined diameter and a predetermined length. The cylindrical member 23 is composed of a PVC pipe, for example. The stick-shaped magnet 25 has such an outer shape as to have a predetermined clearance (an annular path, for example, determined by the flow rate of water to be treated) 24 from an inner wall surface 23a of the cylindrical member 23 and has a length slightly smaller than that of the cylindrical member 23, and is inserted into the cylindrical member 23. The stick-shaped magnet 25 is composed of a plurality of cylindrical small magnets 26 arranged in series. The small magnets 26 are so arranged that their S poles and their N poles are opposite to each other. A permanent magnet is used as the small magnet 26.

The ozone injection and mixing section 22 comprises a cylindrical member for mixing 31, an ozone injection pipe (ozone suction pipe) 32, a blade member for agitation and mixing 33, and a plurality of projections 34. The cylindrical member for mixing 31 is connected to a flange 23b of the cylindrical member 23 in the magnetic treatment section 21. The ozone injection pipe 32 is inserted in an L shape on the upstream side of the cylindrical member for mixing 31. The blade member for agitating and mixing 33 is provided around the ozone injection pipe 32 in the cylindrical member for mixing 31. The projections for agitation and mixing 34 are arranged in the cylindrical member for mixing 31 on the downstream side of the blade member 33.

Figure 5:
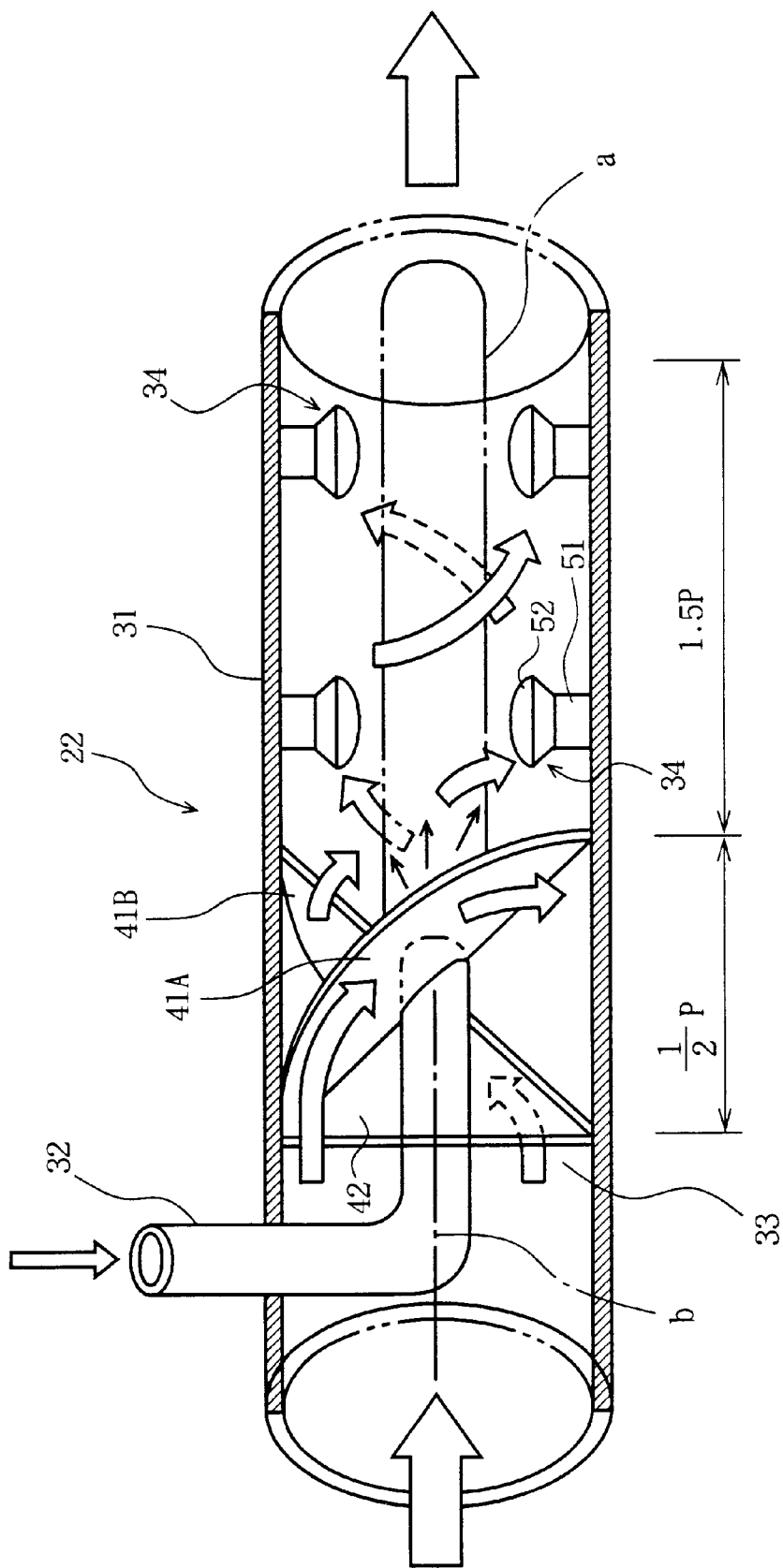
FIG. 5 is a partially cutaway view in perspective of an ozone injection and mixing section in the first magnetic treatment reactor shown in FIG. 4.
Figure 6:
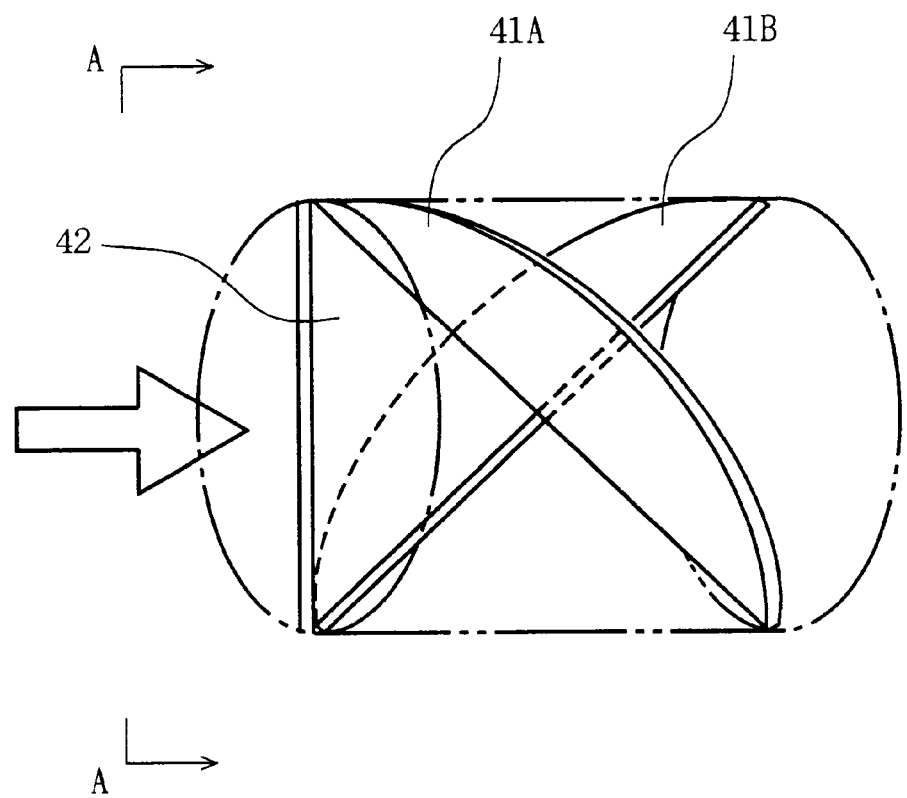
FIG. 6 is a perspective view showing a blade member of the ozone injection and mixing section shown in FIG. 5.
Figure 7:
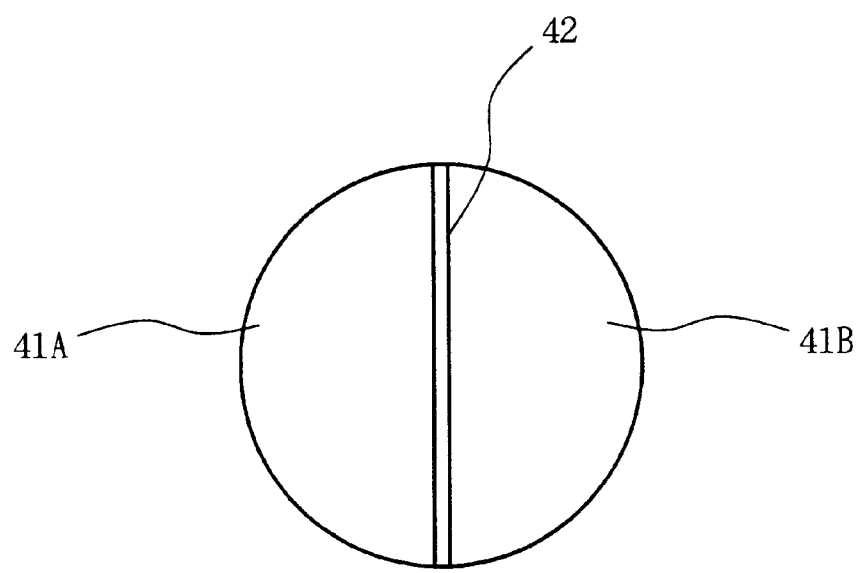
FIG. 7 is a perspective view taken along a line A—A shown in FIG. 6.

FIG. 5 is a partially cutaway view in perspective of the ozone injection and mixing section 22 shown in FIG. 4, FIG. 6 is a perspective view showing the blade member 33 in the ozone injection and mixing section 22 shown in FIG. 5, and FIG. 7 is a perspective view taken along a line A—A. Referring to FIGS. 5 to 7, the blade member 33 and the projections 34 in the ozone injection and mixing section 22 will be described in detail.

The blade member 33 is composed of a pair of semicircular blade plates 41A and 41B. The blade plates 41A and 41B are so arranged as to be inclined at a predetermined angle (for example, preferably 30° to 45°) to the direction of the flow of water to be treated and twisted in the opposite directions. Further, there is provided a partition plate 42 for laterally partitioning a space in front of an intersection of the blade plates 41A and 41B.

Each of the projections 34 comprises a cylindrical portion 51 fixed to an inner wall surface of the cylindrical member for mixing 31 and a mushroom-shaped portion 52 formed at a leading end of the cylindrical portion 51. The plurality of projections 34 are arranged in staggered fashion on the inner wall surface of the cylindrical member for mixing 31. The projections 34 are arranged in the range of not less than 1.5 times the torsion pitch P caused by twisting the blade plates 41A and 41B. The range in which the blade plates 41A and 41B are twisted is P/2 as shown.

Figure 8:
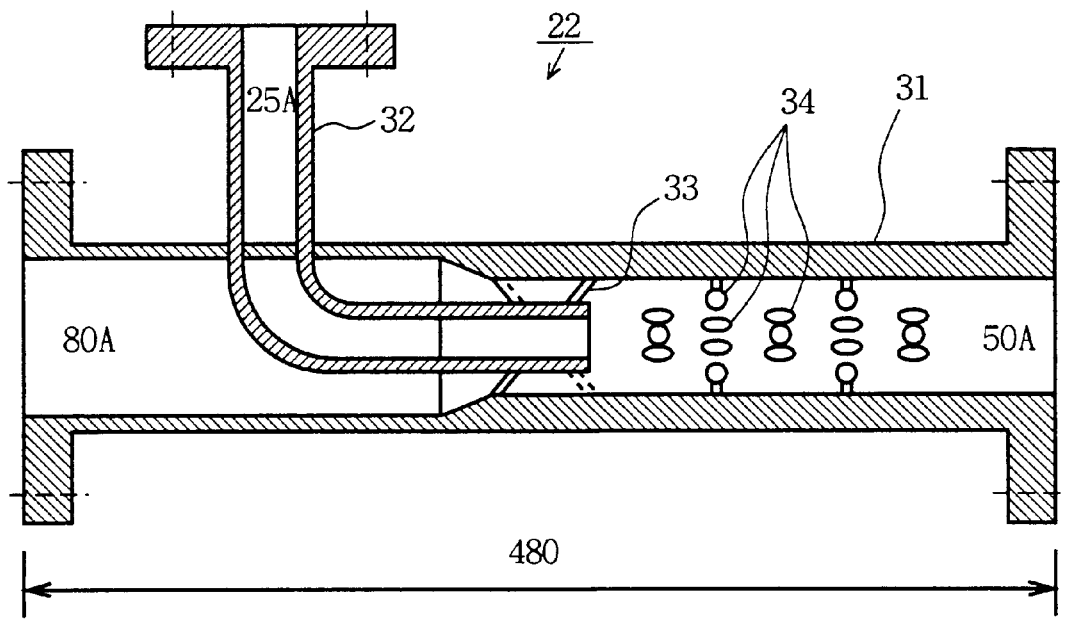
FIG. 8 is a cross-sectional view showing a specific example of the ozone injection and mixing section.

FIG. 8 shows the specific sizes of the ozone injection and mixing section 22. In FIG. 8, 80A denotes nominal size indicating the bore of an introducing portion of water to be treated in the cylindrical member for mixing 31, 50A denotes nominal size indicating the bore of an agitation and mixing portion of water to be treated in the cylindrical member for mixing 31, and 25A denotes nominal size indicating the bore of the ozone injection pipe 32.

Injection of ozone from the ozone generator is carried out by being sucked into the cylindrical member for mixing 31 by an ejector effect of water flowing in the cylindrical member for mixing 31.

Furthermore, a magnetic force of a magnet (a magnetic flux density) is 1000 gauss (1000 to 10000 gauss as a usable range), for example, and the flow rate of water to be treated is approximately 1.5 m/s under the magnetic force. This is 1000 gauss/$m^3 \cdot h$ if it is represented by a magnetic force corresponding to the flow rate of water to be treated, for example.

Furthermore, a volume type filter capable of capturing particles having diameters of not less than several micrometers is used as the first filter 15 and the second filter 19. Examples of a filter medium include one with which a long-fiber sphere is filled. However, sand, for example, is also used.

Description is now made of specific operations performed by the pre-treatment equipment 1 shown in FIG. 3. In FIG. 3, water to be treated is seawater, and includes microbes, bacteria, organic materials (organic matter), or soluble inorganic materials (inorganic matter) such as iron and manganese. They also have colors, odors and the like.

Seawater is stored in the storage tank 11 once, and is introduced into the first magnetic treatment reactor 14 through the transfer pipe by the pump 12. In the first treatment reactor 14, a magnetic force of 1000 to 10000 gauss is exerted on the seawater in the magnetic treatment section 21. The seawater is successively supplied to the cylindrical member for mixing 31 in the ozone injection and mixing section 22. Ozone is injected (sucked) by an ejector effect of the ozone injection pipe 32 from the first ozone generator 13.

In the first magnetic treatment reactor 14, materials to be oxidized which are contained in the seawater, for example, inorganic oxides such as iron and manganese are deposited as colloidal materials, and died aquatic animals and plants become suspended materials by the magnetic action and the ozone oxidation action as well as the agitation and mixing action of the blade member 33 and the projections 34. The colloidal materials and the suspended materials (hereinafter merely referred to as suspended materials and others) are flocculated by the magnetic action, to have diameters of approximately several micrometers to several tens of micrometers.

The reason why the suspended materials and others are thus flocculated by exerting a magnetic force is conceivably that a Lorentz's force is exerted on charged particles dissolving in water, so that a magnetohydrodynamic effect is produced, and crystallization and flocculation are promoted between the charged particles by the effect.

Generally, the surfaces of colloidal particles are negatively charged in water, and are maintained in a stable dispersed state by repulsion therebetween. When water is passed through a magnetic field, however, an electric field is caused upon ion polarization, and attraction (van der Waals attraction) between the particles is exerted by the neutralization action of the charges on the surfaces of the particles, so that the particles easily approach each other and are flocculated.

The seawater which is subjected to the oxidation and flocculation action by the first magnetic treatment reactor 14 is introduced into the first filter 15. In the first filter 15, suspended materials and others flocculated to several micrometers to several tens of micrometers are removed.

The suspended materials and others are thus removed in order to increase the use efficiency of ozone in the subsequent step. Specifically, if the suspended materials and others exist in water, they consume ozone, to prevent the ozone from not being effectively exerted on the oxidation of organic materials in water.

The action in the ozone injection and mixing section 22 in the first magnetic treatment reactor 14 will be described in detail.

Judgment as to how effectively ozone is brought into contact with water to be treated is generally important in terms of effective utilization of the ozone. Particularly when the concentration of a reactant is low, diffusion is a rate-determining step. Therefore, vigorous agitation and mixing are required. However, the vigorous agitation and mixing are performed by the ozone injection and mixing section 22.

Specifically, the water to be treated which is magnetically treated is laterally divided and rectified by the partition plate 42 provided in the cylindrical member for mixing 31, to spirally flow upon application of a strong twist and a high accelerating force by the blade plates 41A and 41B behind the partition plate 42.

Multilayer circulating flow having a concentric circle structure is formed in the cylindrical member for mixing 31 by the spiral flow. Further, a cylindrical low-pressure portion a occurs in a axis center portion of the flow by the area ratio of the cross-sectional area of a flow path to the minimum cross-sectional open area of a current transformation portion. Consequently, ozone is naturally sucked from the ozone injection pipe 32 whose leading end is inserted into a axis center b.

The sucked ozone joins the multilayer circulating flow upon being separated from a negative pressure portion. In the multilayer circulating flow, relative speed is achieved by the difference in density, viscosity or the like between materials constituting the flow to cause turbulent eddy flow. Primary mixing of the water to be treated is vigorously performed by this action.

Thereafter, the multilayer circulating flow comes into the agitation and mixing portion provided with the projections 34, to enter a state where the flow is interrupted in the cylindrical portion 51, and the flow is parted in the radial direction of the cylindrical member for mixing 31 in the mushroom-shaped portion 52.

Furthermore, the projections 34 are arranged in staggered fashion over the range of not less than the twisting pitch P (for example, 1.5 P) of flow caused by twisting the blade plates 41A and 41B, and agitation and mixing by the parting are more effectively performed.

Specifically, when the water to be treated collides with the mushroom-shaped portion 52, cavitation is produced on the front surface, with which the water to be treated collides, of the mushroom-shaped portion 52, negative pressure rear flow is formed on the rear surface thereof. Further, a boundary layer is stripped at the hemispherical head of the mushroom-shaped portion 52.

Therefore, there arises a state where the cylindrical member for mixing 31 is filled with a large amount of turbulent eddy flow, so that the materials constituting the flow are mixed with each other as fine particles, collide with each other in such a manner that heavy mass bodies are directed outward and light mass bodies are directed inward, and thrust through each flow layer.

In flow colliding with the cylindrical portion 51 in the projection 34, ultrafine bubbles having diameters of approximately 0.5 to 3 μm are produced. Circulating flow including the ultrafine bubbles further collides with the subsequent projection 34 so that the density of the bubbles in the flow is increased. The circulating flow also produces a supersonic wave (not less than 40 kHz, for example).

Secondary high-speed reaction is caused by the projections 34 subsequently to the first high-speed reaction caused by the blade members 33 by such a strong parting and collision action.

The water to be treated which is discharged from the first filter 15 is further introduced into the second magnetic treatment reactor 17. In the second magnetic treatment reactor 17, the water to be treated is mixed and oxidized by ozone injected from the second ozone generator 16 again. Of course, the water to be treated is also subjected to the magnetic action at this time. Also in the second magnetic treatment reactor 17, the water to be treated is subjected to the same agitation and mixing action as that in the first magnetic treatment reactor 14.

In the second magnetic treatment reactor 17, mainly organic materials, and particularly hard decomposed organic materials (COD materials) which cannot react in the first magnetic treatment reactor 14 are oxidized by ozone. Although almost all the organic materials are subjected to the oxidation action, the hard decomposed organic materials (high polymers) are only subjected to such a change that a chain in a compound is cut (a change into a low-molecular material), and may, in some cases, exist in water as organic materials (COD materials).

The water to be treated which is discharged from the second magnetic treatment reactor 17 is introduced into the reactor unit 18 with which granulated active carton is filled as a catalyst. In the reactor unit 18, excess ozone in water is decomposed, organic materials made low molecular upon oxidation of the hard decomposed organic materials by ozone are oxidized and decomposed by the active carbon and dissolved oxygen (DO) having a high concentration.

The oxygen concentration in water reaches a point of saturation by injecting ozone in the first magnetic treatment reactor 14 and the second magnetic treatment reactor 17. In an ozone generator using a PSA (Pressure Swing Absorber) method, the content of dissolved oxygen reaches approximately 50 to 60 PPM, for example.

Treated water purified by thus removing microbes, bacteria, organic materials, soluble inorganic materials, and the like is stored in the treated water unit 20, and is then supplied to the reverse osmosis membrane module 2 shown in FIG. 1 or the electrodialyser unit 3 shown in FIG. 2.

Description is now made of embodiments of the method of producing potable water and salt according to the present invention. FIGS. 9, 10, 11 and 12 respectively show producing methods in a comparative example 1, a comparative example 2, a comparative example 3 and a comparative example 4, and FIGS. 13 and 14 respectively show producing methods in an embodiment 1 and an embodiment 2.

Description is now made of an example of calculation of material balance in the comparative examples and the embodiments. In the comparative example 1, the comparative example 2, the comparative example 3, and the embodiment 1, and the embodiment 2, 100 tons of potable water shall be produced per day. The preconditions of the following calculation of material balance will be described.

The TDS (total salt concentration) of original seawater is taken as 35000 mg/L (liter) which is fixed, and the specific gravity thereof is taken as 1.03. Consequently, the salt concentration of the original seawater is $3.5/1.03 \fallingdotseq 3.4$[wt % (% by weight)]. Further, the temperature of the original seawater is taken as 25° C. (fixed). The TDS of the potable water is taken as not more than 500 mg/L, which shall be taken as zero for convenience of calculation.

The recovery of the reverse osmosis membrane module 2 is taken as 35% (fixed). The operating pressure of the reverse osmosis membrane module 2 is as follows:

Operating pressure=osmotic pressure+mechanical output (permeation pressure)

The osmotic pressure of the original seawater is taken as 0.7 kg/cm² when TDS=1000 mg/L, and the operating pressure of the reverse osmosis membrane module 2 in a case where the temperature of the seawater is 25° C. and the recovery is 35% is taken as 56 kg/cm². Further, the permeation pressure of the reverse osmosis membrane module 2 is taken as 20 kg/cm² (fixed).

The TDS of concentrated salt water obtained by the electrodialyser unit 3 is taken as 17.7% by weight (fixed), and the TDS of desalted water is taken as 2.74% by weight (fixed). The amount of discharged water in the embodiment 1 and the embodiment 2 is taken as one-third the amount of original seawater in order to prevent gypsum from being deposited. Further, the amount of steam required to obtain 1 ton of evaporated water by the evaporator 4 is taken as 1.25 tons.

The comparative example 1 in FIG. 9 shows a general seawater desalting method using a reverse osmosis membrane, that is, basic processes of producing potable water. As shown in FIG. 9, seawater is supplied to a pre-treatment equipment 1, and the seawater pretreated by the pre-treatment equipment 1 is introduced into a feedwater inlet of a reverse osmosis membrane module 2. Potable water is obtained from a permeated water outlet of the reverse osmosis membrane module 2, and concentrated salt water is obtained from a concentrated water outlet of the reverse osmosis membrane module 2.

As described above, the recovery of the reverse osmosis membrane module 2 is 35%, the amount of potable water is 100 tons per day, and the salt concentration of the seawater is 3.4% by weight, whereby the quantity of seawater intaken, the amount of condensed salt water and the concentration of the concentrated salt water are as follows:

Quantity of seawater intaken=100/0.35=285.7$\fallingdotseq$286[t/day]

Amount of concentrated salt water=285.7−100=185.7$\fallingdotseq$186[t/day]

Concentration of concentrated salt water=(285.7×0.034/−185.7)×100=5.23$\fallingdotseq$5.2 [wt %]

Consequently, the amount of discharged water is approximately 186 tons per day, and the salt concentration of the discharged water is approximately 5.2% by weight.

Figure 10:
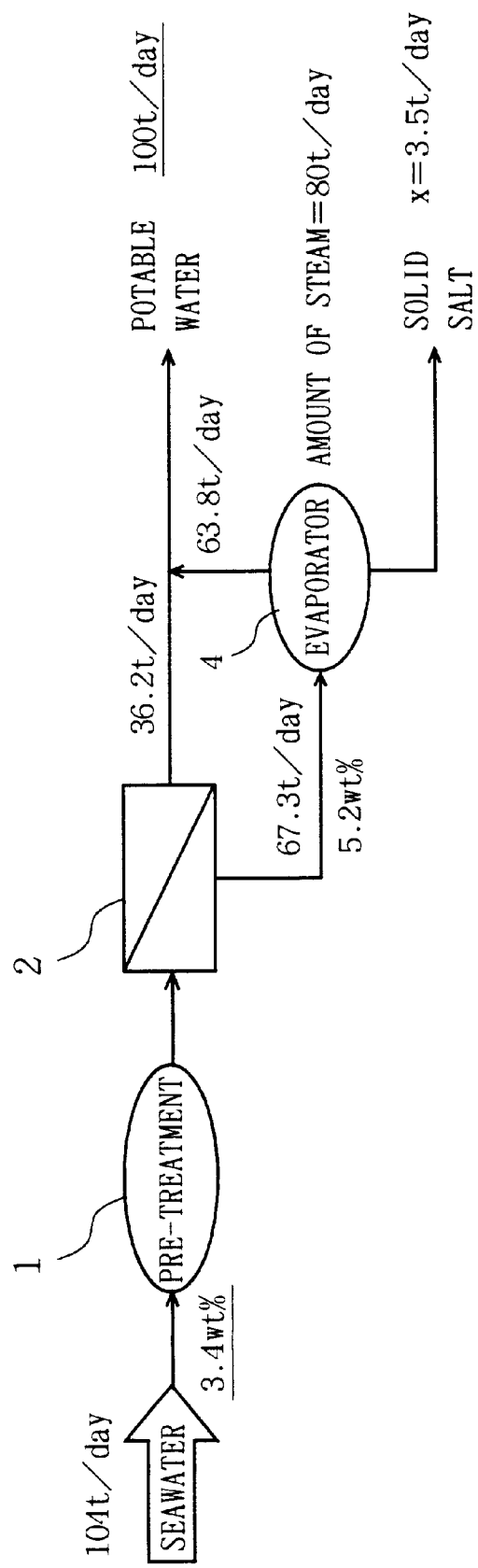
FIG. 10 is a diagram showing a producing method and an example of calculation in a comparative example 2.

The comparative example 2 in FIG. 10 shows a case where potable water is produced using a reverse osmosis membrane, and concentrated salt water is heated and evaporated, to produce solid salt. In this case, the amount of discharged water is zero. As shown in FIG. 10, seawater is supplied to a pre-treatment equipment 1, and the seawater pretreated by the pre-treatment equipment 1 is introduced into a feedwater inlet of a reverse osmosis membrane module 2. Concentrated salt water discharged from a concentrated water outlet of the reverse osmosis membrane module 2 is supplied to an evaporator 4, and permeated water discharged from a permeated water outlet of the reverse osmosis membrane module 2 and evaporated water obtained by the evaporator 4 are supplied as potable water.

Since the amount of potable water is 100 tons per day, and the salt concentration of the seawater is 3.4% by weight, the following equation holds, letting x be the amount of solid salt:

$$x/(100+x)=0.034$$

From the foregoing equation, $x=3.51≒3.5$ [t/day]. Consequently, the quantity of seawater intaken is as follows:

$$\text{Quantity of seawater intaken}=100+3.51=103.51≒104[t/day]$$

Furthermore, the recovery of the reverse osmosis membrane module 2 is 35%, whereby the amount of the permeated water and the amount of the concentrated salt water which are obtained by the reverse osmosis membrane module 2 are as follows:

$$\text{Amount of permeated water}=103.5\times0.35=36.2[t/day]$$

$$\text{Amount of concentrated salt water}=103.5-36.2=67.3[t/\text{per day}]$$

Furthermore, the amount of steam required to obtain 1 ton of evaporated water is 1.25 tons, whereby the amount of stream for evaporation is $63.8\times1.25=79.75≒80$ [t/day].

Figure 11:
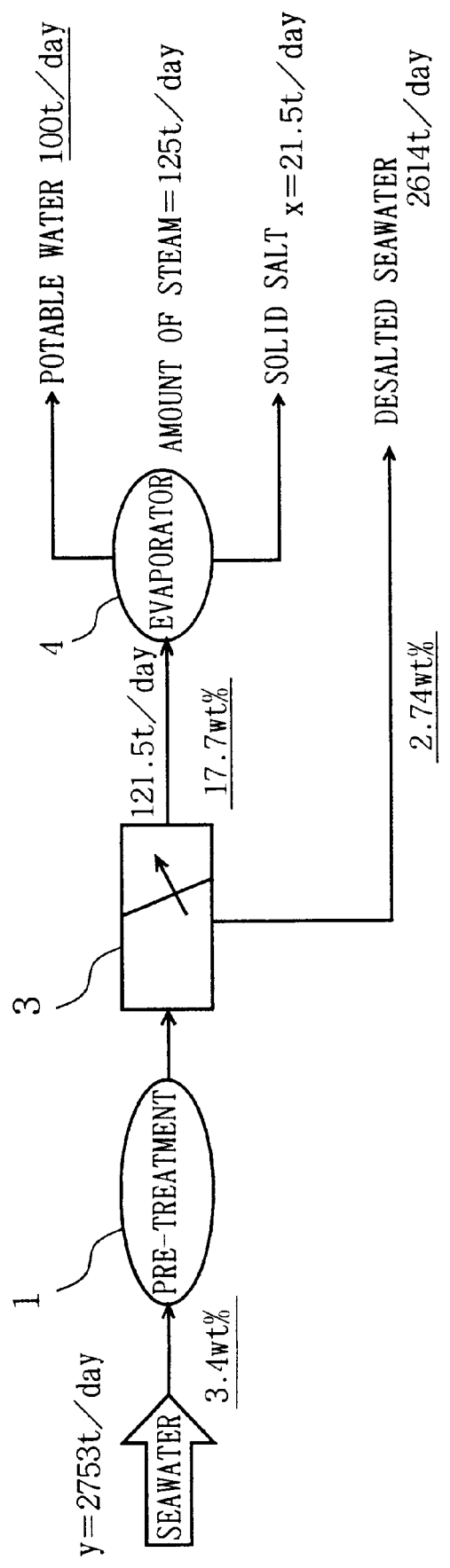
FIG. 11 is a diagram showing a producing method and an example of calculation in a comparative example 3.
Figure 12:
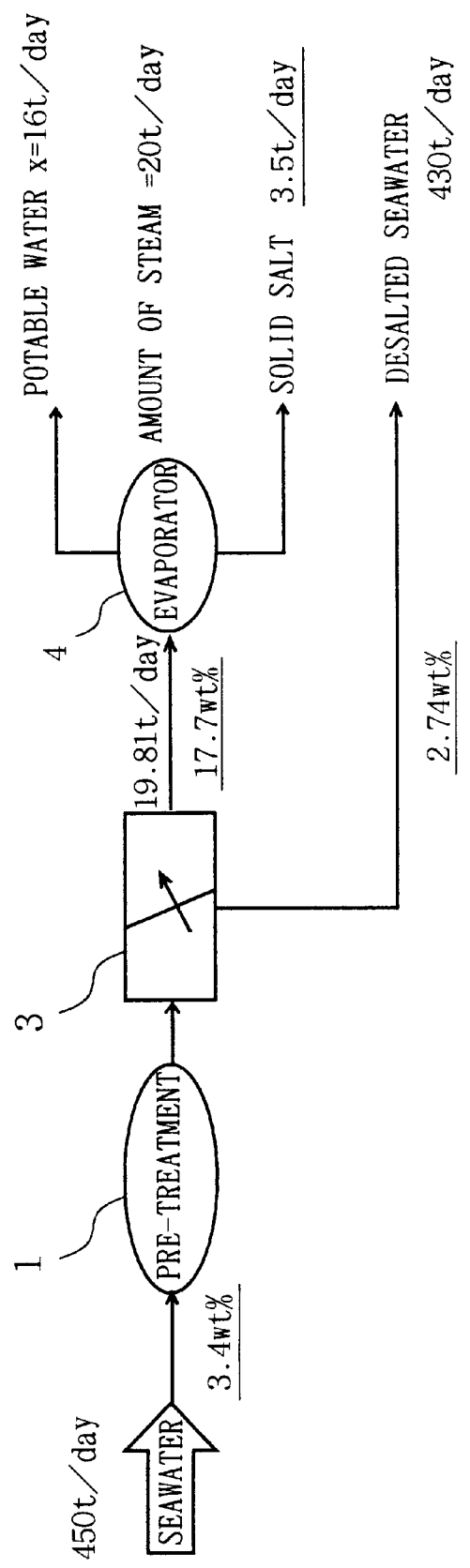
FIG. 12 is a diagram showing a producing method and an example of calculation in a comparative example 4.

The comparative example 3 in FIG. 11 shows a method of producing potable water using electrodialysis (ED), and the comparative example 4 in FIG. 12 shows a method of producing solid salt using electrodialysis (ED).

As shown in FIGS. 11 and 12, seawater is supplied to a pre-treatment equipment 1, and the seawater pretreated by the pre-treatment equipment 1 is introduced into a feedwater inlet of an electrodialyser unit 3. Concentrated salt water discharged from a concentrated water outlet of the electrodialyser unit 3 is supplied to an evaporator 4, and evaporated water and solid salt are obtained by the evaporator 4. The evaporated water obtained by the evaporator 4 becomes potable water. Desalted seawater is discharged from a desalted water outlet of the electrodialyser unit 3.

In the comparative example 3 in FIG. 11, 100 tons of potable water shall be produced per day. Since the TDS of the concentrated salt water obtained by the electrodialyser unit 3 is 17.7% by weight, the following equation holds, letting x be the amount of solid salt:

$$x/(100+x)=0.177$$

Consequently, $x=21.5$ [t/day].

The amount of concentrated salt water discharged from the concentrated water outlet of the electrodialyser unit 3 is $100+21.5=121.5$ [t/day]. Further, the salt concentration of the seawater is 3.4% by weight, and the TDS of the desalted water obtained by the electrodialyser unit 3 is 2.74% by weight, whereby the following equation holds by salt balance, letting y be the quantity of seawater intaken:

$$0.034y=21.5+(y-121.5)\times0.0274$$

Consequently, the quantity of seawater intaken y is $y=18.17/0.0066=2753$ [t/day]. Further, the amount of discharged water (the amount of desalted seawater) becomes $y-121.5=2613.5≒2614$ [t/day]. Further, the amount of stream for evaporation is $100\times1.25=125$ [t/day].

In the comparative example 4 in FIG. 12, the same amount of solid salt (3.51 tons per day) as that in the comparative example shall be produced. Since the TDS of concentrated salt water obtained by an electrodialyser unit 3 is 17.7% by weight, the following equation holds, letting x be the amount of potable water.

$$3.51/(x+3.51)=0.177$$

Consequently, $x=2.889/0.177=16.3≒16[t/day]$.

The amount of concentrated salt water discharged from the concentrated water outlet of the electrodialyser unit 3 becomes $16.3+3.51=19.81$ [t/day]. Since the salt concentration of seawater is 3.4% by weight, and the TDS of desalted water obtained by the electrodialyser unit 3 is 2.74% by weight, the following equation holds by salt balance, letting y be the quantity of seawater intaken:

$$0.034y=3.51+(y-19.81)\times0.0274$$

Consequently, $y=449.5≒450$ [t/day]. Further, the amount of discharged water (the amount of desalted seawater) is $449.5-19.81=429.7≒430$ [t/day]. Further, the amount of stream for evaporation becomes $16.3\times1.25=20.4≒20$ [t/day].

Figure 13:
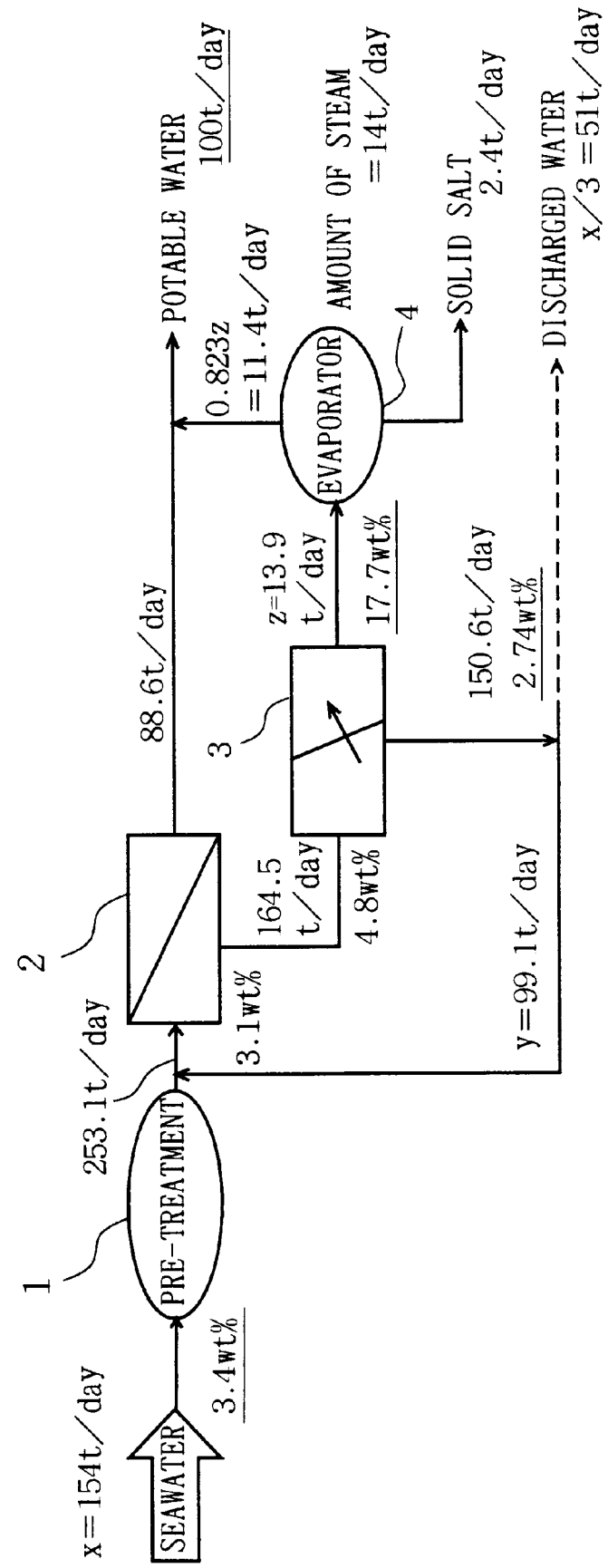
FIG. 13 is a diagram showing a producing method and an example of calculation in an embodiment 1.

The embodiment 1 in FIG. 13 shows a method of producing potable water and salt using the producing apparatus shown in FIG. 1, wherein the reverse osmosis membrane module 2 is provided in the preceding stage, and the electrodialyser unit 3 is provided in the succeeding stage.

Since the amount of potable water is 100 tons per day, the recovery of the reverse osmosis membrane module 2 is 35%, and the TDS of concentrated salt water obtained by the electrodialyser unit 3 is 17.7% by weight, the following equation holds by potable water balance, letting x be the quantity of seawater intaken, y be the amount of desalted water returned to the feedwater inlet of the reverse osmosis membrane module 2 from the desalted water outlet of the electrodialyser unit 3, and z be the amount of concentrated salt water discharged from the concentrated water outlet of the electrodialyser unit 3:

$$(x+y)\times0.35+0.823z=100 \quad (1)$$

Furthermore, the amount of discharged water is one-third the quantity of seawater intaken, whereby the following equation holds by total material balance:

$$x=100+(\tfrac{1}{3})x+0.177z \quad (2)$$

Furthermore, the salt concentration of the seawater is 3.4% by weight, and the TDS of the desalted water obtained by the electrodialyser unit 3 is 2.74% by weight, whereby the following equation holds by salt balance:

$$0.034x=0.177z+(\tfrac{1}{3})x\times0.0274 \quad (3)$$

When the foregoing simultaneous equations (1), (2), and (3) are solved, the following values are obtained:

$$x=154[t/day]$$

$$y=99.1[t/day]$$

$$z=13.9[t/day]$$

Consequently, the amount of discharged water is $(\tfrac{1}{3})x≒51$ [t/day], and the TDS of the desalted water obtained by the electrodialyser unit 3 is 2.74% by weight, whereby the salt concentration of the discharged water is approximately 2.7% by weight. The amount of solid salt is $0.177z≒2.4$ [t/day]. Further, the amount of evaporated water is $0.823z≒11.4$ [t/day], and the amount of steam for evaporation is $11.4\times1.25≒14[t/day]$.

The embodiment 2 in FIG. 14 shows a method of producing potable water and salt using the producing apparatus shown in FIG. 2, wherein the electrodialyser unit 3 is provided in the preceding stage, and the reverse osmosis membrane module 2 is provided in the succeeding stage.

Since the amount of potable water is 100 tons per day, the amount of discharged water is one-third the quantity of seawater intaken, and the TDS of concentrated salt water obtained by the electrodialyser unit 3 is 17.7% by weight, the following equation holds by total material balance, letting x be the quantity of seawater intaken, y be the amount of desalted water supplied to the feedwater inlet of the reverse osmosis membrane module 2 from the desalted water outlet of the electrodialyser unit 3, and z be the amount of concentrated salt water discharged from the concentrated water outlet of the electrodialyser unit 3:

$$x = 0.177z + 100 + (1/3)x \quad (4)$$

Furthermore, the recovery of the reverse osmosis membrane module is 35%, whereby the following equation holds by potable water balance:

$$0.35y + 0.823z = 100 \quad (5)$$

Furthermore, the salt concentration of seawater is 3.4% by weight, whereby the following equation holds by salt balance:

$$0.034x = 0.177z + (2/3)x \times (1/0.65) \quad (6)$$

When the foregoing simultaneous equations (4), (5), and (6) are solved, the following values are obtained:

$$x = 305.6 \approx 306 \, [t/day]$$

$$y = 261.3 \approx 261 \, [t/day]$$

$$z = 10.36 \approx 10.4 \, [t/day]$$

Consequently, the amount of discharged water is $(1/3)x = 101.9 \approx 102 \, [t/day]$. The amount of concentrated salt water discharged from the concentrated water outlet of the reverse osmosis membrane module 2 is $0.65y = 169.8 \, [t/day]$, and the amount of concentrated salt water returned to the electrodialyser unit 3 is $169.8 - 101.9 = 67.9 \, [t/day]$. Further, the TDS of the desalted water obtained by the electrodialyser unit 3 is 2.74% by weight, whereby the salt concentration of the discharged water is $0.027y/169.8 \times 100 \approx 4.2 \, [wt\%]$.

The amount of solid salt is $0.0177z \approx 1.8 \, [t/day]$. Further, the amount of evaporated water is $0.823z = 8.53 \, [t/day]$, and the amount of steam for evaporation is $8.53 \times 1.25 \approx 11 \, [t/day]$.

The results of the above-mentioned calculation are shown in Table 1 and Table 2.

TABLE 1

|  | COMPARATIVE EXAMPLE 1 | COMPARATIVE EXAMPLE 2 | COMPARATIVE EXAMPLE 3 |
|---|---|---|---|
| process | only RO | RO + evaporation | ED + evaporation |
| amount of potable water (t/day) | 100 | 100 | 100 |
| amount of solid salt (t/day) | 0 | 3.5 | 21.5 |
| quantity of seawater intaken (t/day) | 286 | 104 | 2735 |
| amount of discharged water (t/day) | 186 | 0 | 2614 |

TABLE 1-continued

|  | COMPARATIVE EXAMPLE 1 | COMPARATIVE EXAMPLE 2 | COMPARATIVE EXAMPLE 3 |
|---|---|---|---|
| salt concentration of discharged water (t/day) | 5.2 | — | 2.7 |
| amount of steam for evaporation (t/day) | 0 | 80 | 125 |
| RO |  |  |  |
| amount of feedwater (t/day) | 286 | 104 | — |
| salt concentration of feedwater (t/day) | 3.4 | 3.4 | — |
| ED |  |  |  |
| amount of feedwater (t/day) | — | — | 2753 |
| salt concentration of feedwater (t/day) | — | — | 3.4 |

TABLE 2

|  | COMPARATIVE EXAMPLE 4 | EMBODIMENT 1 | EMBODIMENT 2 |
|---|---|---|---|
| process | ED + evaporation | ED + RD + evaporation | ED + RO + evaporation |
| amount of potable water (t/day) | 16 | 100 | 100 |
| amount of solid salt (t/day) | 3.5 | 2.4 | 1.8 |
| quantity of seawater intaken (t/day) | 450 | 154 | 306 |
| amount of discharged water (t/day) | 430 | 51 | 102 |
| salt concentration of discharged water (t/day) | 2.7 | 2.7 | 4.2 |
| amount of steam for evaporation (t/day) | 20 | 14 | 11 |
| RO |  |  |  |
| amount of feedwater (t/day) | — | 253 | 261 |
| salt concentration of feedwater (t/day) | — | 3.1 | 2.7 |
| ED |  |  |  |
| amount of feedwater (t/day) | 450 | 165 | 374 |
| salt concentration of feedwater (t/day) | 3.4 | 4.8 | 3.5 |

In the comparative example 1, the amount of discharged water is as large as 186 tons per day, and the salt concentration of the discharged water is 5.2% by weight which is the highest. In the comparative example 2, the amount of discharged water is zero, and the amount of solid salt is as large as 3.5 tons per day. However, the amount of stream for evaporation is as large as 80 tons per day. Consequently, the cost of the solid salt is increased, whereby a large-scale boiler facility is required.

In the comparative example 3, the amount of solid salt is 21.5 tons per day which is the largest. However, the quantity of seawater intaken is 2735 tons per day which is very large, and the amount of discharged water is 2614 tons per day which is very large. Moreover, the amount of stream for evaporation is 125 tons per day which is the largest. In the comparative example 4, the amount of solid salt is as large as 3.5 tons per day, and the amount of stream for evaporation is as small as 20 tons per day. However, the amount of potable water is as small as 16 tons per day, the quantity of seawater intaken is as large as 450 tons per day, and the amount of discharged water is as large as 430 tons per day. Therefore, the cost of the solid salt is low, while the cost of the potable water is high.

In the embodiment 1, 100 tons of potable water per day and 2.4 tons of solid salt per day are obtained, and the quantity of seawater intaken is as small as 154 tons per day. Further, the amount of discharged water is 51 tons per day which is the smallest, the salt concentration of the discharged water is as low as 2.7% by weight, and the amount of stream for evaporation is 14 tons per day which is very small. Consequently, the solid salt and the potable water can be obtained at low cost.

In the embodiment 2, 100 tons of potable water per day and 1.8 tons of solid salt per day are obtained. However, the quantity of seawater intaken is 306 tons per day which is slightly large. The amount of discharged water is as small as 102 tons per day, and the salt concentration of the discharged water is 4.2 tons per day which is slightly high. However, the amount of stream for evaporation is 11 tons per day which is the smallest.

The costs of energy for producing solid salt in the comparative example 2, the embodiment 1 and the embodiment 2 are calculated by way of trial. The service unit cost of power is 15 yen/kWh, and the service unit cost of stream is 4000 yen/kWh.

In the comparative example 2, the concentrated salt water (having a salt concentration of 5.2% by weight) is evaporated and solidified, to obtain 3.5 tons of solid salt per day. At this time, the amount of steam for evaporation required is 80 tons per day, whereby the steam consumption rate (the amount of steam per 1 ton of solid salt) is (80/3.5)=22.8. Accordingly, the cost of energy for producing the solid salt is 22.8×4000=91200 [yen/t].

On the other hand, in the embodiment 1 and the embodiment 2, the concentrated salt water which is concentrated to a salt concentration of 17.7% by weight by the electrodialyser unit 3 is evaporated and solidified. Power required for electrodialysis is 194 kWh per 1 ton of solid salt, and the steam consumption rate per 1 ton of solid salt is 5.8. Accordingly, the cost of energy for producing the solid salt is 194×15+5.8×4000=26110 [yen/t].

As can be seen from the foregoing results, the costs of energy for producing solid salt in the embodiment 1 and the embodiment 2 are not more than one-third that in the comparative example 2.

High-pressure pumps for the reverse osmosis membranes in the embodiment 1 and the embodiment 2 are then compared with each other in power. Shaft power Ps [kW] required to drive the high-pressure pump is expressed by the following equation:

$$Ps=0.27\times10^{-2}\times\gamma QH/\eta \qquad (7)$$

where $\gamma$ denotes the fluid density [t/m$^3$], Q denotes the flow rate [m$^3$/day], and H denotes pressure [kg/cm$^2$].

In the embodiment 1, Q=253 [m$^3$/day], salt concentration=3.14 [wt %], and H=32300×(1/0.65)×0.7+20=54.8 [kg/cm$^2$]. In the embodiment 2, Q=261 [m$^3$/day], salt concentration=2.74 [wt %], and H=280000×(1/0.65)×0.7+20=51.2 [kg/cm$^2$].

Consequently, the ratio of pump shaft power Ps$_1$ in the embodiment 1 to pump shaft power Ps$_2$ in the embodiment 2 is expressed by the foregoing equation (7):

$$Ps_1/Ps_2=(253\times54.8)/(261\times51.2)\approx1.05$$

The high-pressure pumps for the reverse osmosis membranes in the embodiment 1 and the embodiment 2 are approximately equal in shaft power.

From the foregoing results, in the embodiment 1 and the embodiment 2, the reverse osmosis membrane module 2 and the electrodialyser unit 3 are combined with each other, whereby the utilization factor of the seawater is high, the amount of discharged water is small, and the salt concentration of the discharged water is low. Particularly in the embodiment 1, the quantity of seawater intaken and the amount of discharged water are very small, and the utilization factor of the seawater is the highest. For example, when the quantity of seawater intaken in the comparative example 1 using only the reverse osmosis membrane module 2 is taken as 100, the quantity of seawater intaken is 50 to 60 in the embodiment 1. Consequently, the construction cost of a pre-treatment equipment is low, and the operating cost is reduced by approximately 40%. Furthermore, in the embodiment 1, the salt concentration of the discharged water is the lowest, whereby there is no possibility that weeds and fishes such as the young of fishes and shellfishes are adversely affected.

Furthermore, pretreatment without injecting medicines using flocculation and filtration by exertion of a magnetic force and injection of ozone is carried out in the pre-treatment equipment 1, whereby there is no possibility of phytotoxicity. Therefore, potable water can be produced while producing special salt containing mineral in seawater.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for producing potable water and salt, comprising:

a pre-treatment equipment for pretreating the salt water using ozone;

a reverse osmosis membrane module for separating salt water pretreated by said pre-treatment equipment into permeated water and concentrated salt water;

an electrodialyser unit for separating said concentrated salt water obtained by said reverse osmosis membrane module into concentrated salt water and desalted water; and an evaporator for evaporating moisture of said concentrated salt water obtained by said electrodialyser unit to dry salt, said permeated water obtained by said reverse osmosis membrane module and evaporated water obtained by said evaporator being supplied as potable water, wherein said pre-treatment equipment comprises
an ozone generator;
a magnetic treatment reactor comprising a magnetic treatment section, into which the salt water is introduced, for exerting a predetermined magnetic force on the salt water, and an ozone injection and mixing section for infecting ozone generated by said ozone generator with the salt water from the magnetic treatment section, followed by mixing; and
a filter for removing a flocculated material in the salt water obtained by said magnetic treatment reactor,
said ozone injection and mixing section of said magnetic treatment reactor including
a cylindrical member for mixing;
an ozone injection pipe inserted on the upstream side of said cylindrical member for mixing;
a blade member for agitation and mixing provided around said ozone injection pipe in said cylindrical member for mixing; and
a plurality of projections arranged in said cylindrical member for mixing on the downstream side of said blade member.

2. The apparatus according to claim 1, further comprising a path for returning a part or all of the desalted water obtained by said electrodialyser unit to said reverse osmosis membrane module.

3. The apparatus according to claim 1, wherein said electrodialyser unit includes an ion exchange membrane having selective permeability for preventing the permeation of predetermined divalent anion.

4. The apparatus according to claim 1, wherein said blade member is composed of a pair of semicircular blade plates, said blade plates being inclined at a predetermined angle relative to the direction of the flow of water to be treated and twisted in the opposite directions, and wherein said ozone injection and mixing section further includes a partition plate for laterally partitioning a space in front of an intersection of said blade plates.

5. The apparatus according to claim 1, wherein each of said projections comprises
a cylindrical portion fixed to an inner wall surface of said cylindrical member for mixing; and
a mushroom-shaped portion formed at a leading end of said cylindrical portion,
said plurality of projections being arranged in staggered fashion on the inner wall surface of said cylindrical member for mixing.

6. An apparatus for producing potable water and salt, comprising:
a pre-treatment equipment for pretreating the salt water using ozone;
a reverse osmosis membrane module for separating salt water pretreated by said pre-treatment equipment into permeated water and concentrated salt water;
an electrodialyser unit for separating said concentrated salt water obtained by said reverse osmosis membrane module into concentrated salt water and desalted water; and
an evaporator for evaporating moisture of said concentrated salt water obtained by said electrodialyser unit to dry salt,
said permeated water obtained by said reverse osmosis membrane module and evaporated water obtained by said evaporator being supplied as potable water,
wherein said pre-treatment equipment comprises
first and second ozone generators;
a first magnetic treatment reactor comprising a magnetic treatment section, into which the salt water is introduced, for exerting a predetermined magnetic force on the salt water, and an ozone injection and mixing section for injecting ozone generated by said first ozone generator into the salt water from said magnetic treatment section, followed by agitation;
a first filter for removing a flocculated material in the salt water obtained by said first magnetic treatment reactor;
a second magnetic treatment reactor comprising a magnetic treatment section, into which the salt water discharged from said first filter is introduced, for exerting a predetermined magnetic force on the salt water, and an ozone injection and mixing section for injecting ozone generated by said second ozone generator into the salt water from the magnetic treatment section, followed by mixing;
a reactor unit, into which the salt water discharged from said second magnetic treatment reactor is introduced, for oxidizing and decomposing the salt water by a catalyst bed composed of active carbon; and
a second filter for removing a flocculated material in the salt water obtained by said reactor unit,
said ozone injection and mixing section of each of said first and second magnetic treatment reactor including
a cylindrical member for mixing;
an ozone injection pipe inserted on the upstream side of said cylindrical member for mixing;
a blade member for agitation and mixing provided around said ozone injection pipe in said cylindrical member for mixing; and
a plurality of projections arranged in said cylindrical member for mixing on the downstream side of said blade member.

7. The apparatus according to claim 6, wherein said blade member is composed of a pair of semicircular blade plates, said blade plates being inclined at a predetermined angle relative to the direction of the flow of water to be treated and twisted in the opposite directions, and wherein said ozone injection and mixing section further includes a partition plate for laterally partitioning a space in front of an intersection of said blade plates.

8. The apparatus according to claim 6, wherein each of said projections comprises
a cylindrical portion fixed to an inner wall surface of said cylindrical member for mixing; and
a mushroom-shaped portion formed at a leading end of said cylindrical portion,
said plurality of projections being arranged in staggered fashion on the inner wall surface of said cylindrical member for mixing.

* * * * *